Patented Oct. 30, 1923.

1,472,319

UNITED STATES PATENT OFFICE.

ERNST BECKMANN, OF BERLIN-DAHLEM, GERMANY, ASSIGNOR, BY MESNE ASSIGNMENTS, TO THE CHEMICAL FOUNDATION, INC., A CORPORATION OF DELAWARE.

PROCESS FOR PREPARING A FODDER FROM STRAW OR OTHER MATERIALS CHARACTERIZED BY THEIR CONTENTS OF RAW FIBERS.

No Drawing.    Application filed April 15, 1919.   Serial No. 290,333.

*To all whom it may concern:*

Be it known that I, Professor Dr. ERNST BECKMANN, a citizen of the State of Germany, and residing at Berlin-Dahlem, Thielallee 63, in the State of Germany, have invented certain new and useful improvements in or relating to a process for preparing a fodder from straw or other materials characterized by their contents of raw fibers (for which I have filed applications in Germany, May 18, 1918; Denmark, January 18, 1919; Austria, January 20, 1919; Hungary, January 20, 1919; Norway, February 4, 1919; and France, February 10, 1919), of which the following is a specification.

In a co-pending application there is set forth a method for the preparation of a fodder from straw and similar materials by disintegrating the same, after it has been cut into small pieces, by means of caustic alkali according to which the caustic alkali acts upon the straw at ordinary temperature, that is, about 20° C. In this process not any additional heat is required and the action continues for a period of time depending upon the concentration of the caustic.

The present invention relates to a further development of this process for the purpose of decreasing the amount of the disintegrating substance required, such as caustic soda, alkaline sulphides and the like. The straw undergoes a preliminary treatment with slaked lime in the form of limewater without heating. It has been shown that the disintegrating substances when acting upon straw thus preliminarily treated suffer comparatively only about half the reduction of titer, so that with an accordingly reduced quantity of disintegrating substance the same disintegrating effect can be obtained as when treated with caustic.

When disintegrating in the process according to the prior patent application, 100 ks. of straw are treated with about 12 ks. of caustic potash. Of the latter quantity about one half, that is, 6 ks., are neutralized and therefore rendered ineffective for the disintegrating process. When a preliminary treatment with slaked lime is applied the loss of caustic potash sinks as low as about 2.6 ks.

In order to carry out the process which is the object of the present invention, I may proceed as follows: 100 ks. of straw are soaked with about 1000 to 2000 liters of water and then about 5 ks. of quick-lime are added in the form of milk of lime. After allowing to stand for several hours with frequent stirring of the mixture including the undissolved lime, the liquid is drawn off and the straw is repeatedly rinsed and washed out with water. The wet straw thus preliminarily treated is then disintegrated according to the process of treating with caustic lyes with the modification that, in consequence of prior treatment, about one-third less of the disintegrating substance is required than otherwise.

The calcium salts formed in the lime process must be removed by repeated washing with water before the addition of caustic soda since otherwise a double decomposition with the caustic soda will occur.

The process is applicable to other materials of a composition similar to straw and characterized by their content of raw fibers such as, for instance, rush, forest grass, Indian corn straw, chaff and the like.

I claim:

1. The process for preparing fodder from straw and like materials which comprises cutting the material into small pieces, treating with calcium hydroxide at ordinary temperature, and then disintegrating with caustic alkali.

2. The process for preparing fodder from straw and like materials which comprises cutting the material into small pieces, treating with calcium hydroxide at a temperature of about 20° C., removing the calcium salts, and finally disintegrating with caustic alkali.

3. The process for preparing fodder from straw and like materials which comprises cutting the material into small pieces, treating with calcium hydroxide at a temperature of about 20° C., removing the calcium salts by washing with water, and then disintegrating with an aqueous solution of a caustic alkali.

4. The process for preparing fodder from straw and like materials which comprises cutting the material into small pieces, treating with calcium hydroxide at a temperature of about 20° C., removing the calcium salts by washing with water, and then disintegrating with an aqueous solution of sodium hydroxide.

In testimony whereof I have affixed my signature in presence of two witnesses.

PROF. DR. ERNST BECKMANN.

Witnesses:
M. BLUMENREICH,
DR. BRUNERTZUCH.